March 4, 1969  C. F. CHENOT  3,431,215
EUROPIUM ACTIVATED STRONTIUM FLUOROBORATE PHOSPHOR
Filed Oct. 11, 1965
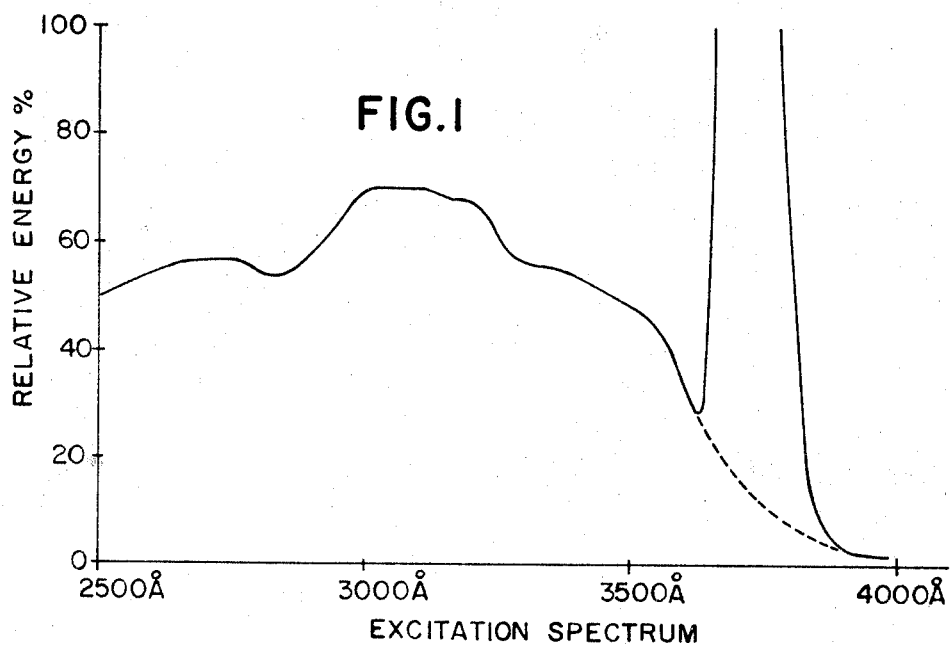
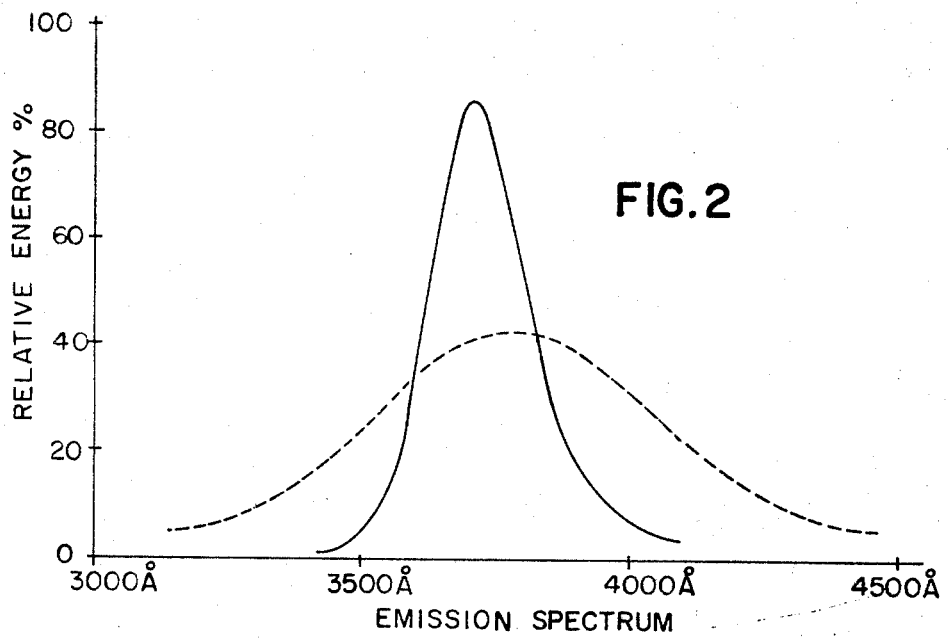
CHARLES F. CHENOT
INVENTOR.
BY
ATTORNEY

United States Patent Office 3,431,215
Patented Mar. 4, 1969

3,431,215
EUROPIUM ACTIVATED STRONTIUM
FLUOROBORATE PHOSPHOR
Charles F. Chenot, Towanda, Pa., assignor to Sylvania
Electric Products Inc., a corporation of Delaware
Filed Oct. 11, 1965, Ser. No. 494,663
U.S. Cl. 252—301.4      5 Claims
Int. Cl. C09k *1/66, 1/04*

ABSTRACT OF THE DISCLOSURE

A strontium fluoroborate phosphor activated by europium. The phosphor is useful in low pressure or high pressure electric discharge devices and cathode ray tubes.

---

This invention relates to fluorescent phosphors and particularly those which are excited by a low pressure mercury discharge to produce ultraviolet light emission.

Fluorescent phosphors which produce ultraviolet light emission are known to the art. I have discovered, however, that a strontium fluoroborate phosphor can be activated by europium to produce an ultraviolet emission which has a higher peak height and narrower emission than those which are currently used commercially. Moreover, the brightness is better than many commercially used ultraviolet emitting phosphors and the maintenance is comparable. Borate-type phosphors have previously been disclosed as fluorescent materials and europium has been disclosed as an activator for other types of matrices. However, when a phosphor is prepared according to the formula $Sr_{0.90 \text{ to } 0.99}F_{0.95 \text{ to } 1.00}B_4O_{6.5}:Eu_{0.005 \text{ to } 0.05}$ new and unexpected results are realized.

In particular, I have discovered that the europium activated strontium fluoroborate phosphor of my invention emits in a very narrow range in the near ultraviolet spectrum. This phosphor shows an increase saturation, that is, a narrow band emission, when compared to ultraviolet emitting phosphors having similar emission characteristics. It achieves peak height measurements of 200% of comparable materials and has half peak width measurements of about 200 A. which is 31% of the width of a comparable standard. Strontium fluoroborate activated by europium shows a very broad excitation spectrum starting at about the emission peak of the phosphor in the near ultraviolet and extending into the far ultraviolet with a maximum excitation at about 3000 A.

Accordingly, the primary object of my invention is the realization of a highly-saturated, ultraviolet light emitting phosphor which can be used in low pressure electric discharge devices.

A feature of my invention is the activation of strontium fluoroborate with europium, the quantities of the fluoride, strontium and europium being closely controlled.

The many other objects, features and advantages of my invention will become manifest to those conversant with the art when taken in conjunction with the accompanying drawings.

Of these drawings:

FIGURE 1 is an excitation spectrum of a strontium fluoroborate phosphor activated by europium.

FIGURE 2 is an emission spectrum of the above-described phosphor and is compared to a barium-magnesium-zinc-calcium orthosilicate activated by lead and arsenic which is phosphor used commercially for ultraviolet emitting lamps.

I have discovered that the phosphor should have the following formulation, based upon starting materials: $Sr_{0.90 \text{ to } 0.99}F_{0.85 \text{ to } 1.00}B_4O_{6.5}:Eu_{0.005 \text{ to } 0.05}$. Either below or above the stated proportions, the phosphor does not emit to its optimum performance. As shown in FIGURE 2 of the drawing, the peak height of the strontium fluoroborate phosphor activated by europium (shown in solid lines) is better than twice of the height of the barium magnesium zinc calcium orthosilicate activated by lead and arsenic (shown in dotted lines). The latter phosphor is a standard commercially available material in the art. Furthermore, the energy in my new phosphor is concentrated within a rather narrow peak whereas the orthosilicate phosphor has a wide band spread.

With reference to FIGURE 1, my phosphor has a broad excitation band in the range of 2500 to 3500 A. which is highly desirable for a material that will be used in low pressure electric discharge devices.

The following specific example is offered as a method which is illustrative of preparation of my phosphor and is not intended to be limitative upon the claims.

Example I

Strontium nitrate, boric acid, and europium oxide ($Eu_2O_3$, dissolved initially in dilute nitric acid) in the form of fine powders are dissolved completely in water at about 80° C. in the molecular proportions:

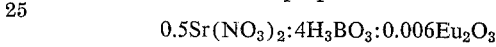
$$0.5Sr(NO_3)_2 : 4H_3BO_3 : 0.006Eu_2O_3$$

A 1 to 1 acetone and ammonium hydroxide mixture is added slowly to the above solution with vigorous stirring until the complex co-precipitation of a white, fine precipitate is complete and a very basic slurry results. The slurry is cooled to less than 20° C. followed by filtering and drying the resulting precipitate.

To the dried precipitate, 0.250 mole (per above proportions) $SrF_2$ is added, followed by grinding and thorough blending. This material is initially fired for 40 minutes at 800° C. in an open quartz crucible under air or light oxidizing conditions.

After the initial firing, 0.238 mole (per above proportions) of $SrF_2$ is added to the first-step-fired material, followed by grinding and thorough blending. This material is second-step fired for 2 hours at 890° C. in an open quartz crucible under mild reducing conditions, e.g., 10–20% $H_2$ in $N_2$.

The final product exhibits a bright, saturated ultraviolet luminescence with a narrow emission peak at 3700 A. as illustrated in FIGURE 2.

As my invention, I claim:

1. A strontium fluoroborate phosphor activated by europium in at least sufficient quantities to produce luminescence.

2. The fluoroborate according to claim 1 wherein the europium is in the +2 valence state.

3. A fluorescent material having the formula $Sr_{0.90 \text{ to } 0.99}F_{0.95 \text{ to } 1.00}B_4O_{6.5}:Eu_{0.005 \text{ to } 0.05}$.

4. The composition according to claim 1 herein the total of the strontium and europium atoms is substantially stoichiometric with the borate radical.

5. The composition according to claim 4 wherein the europium is in the +2 valence state.

References Cited

Kroger: Some Aspects of the Luminescence of Solids—1948, p. 292.

Goldberg: Luminescence of Inorganic Solids—1966, p. 335.

TOBIAS E. LEVOW, *Primary Examiner.*

R. D. EDMONDS, *Assistant Examiner.*